No. 673,735. Patented May 7, 1901.
A. L. SIEGEL & J. ST. J. LAMBE.
STREET CAR FENDER.
(Application filed Feb. 2, 1901.)
(No Model.)
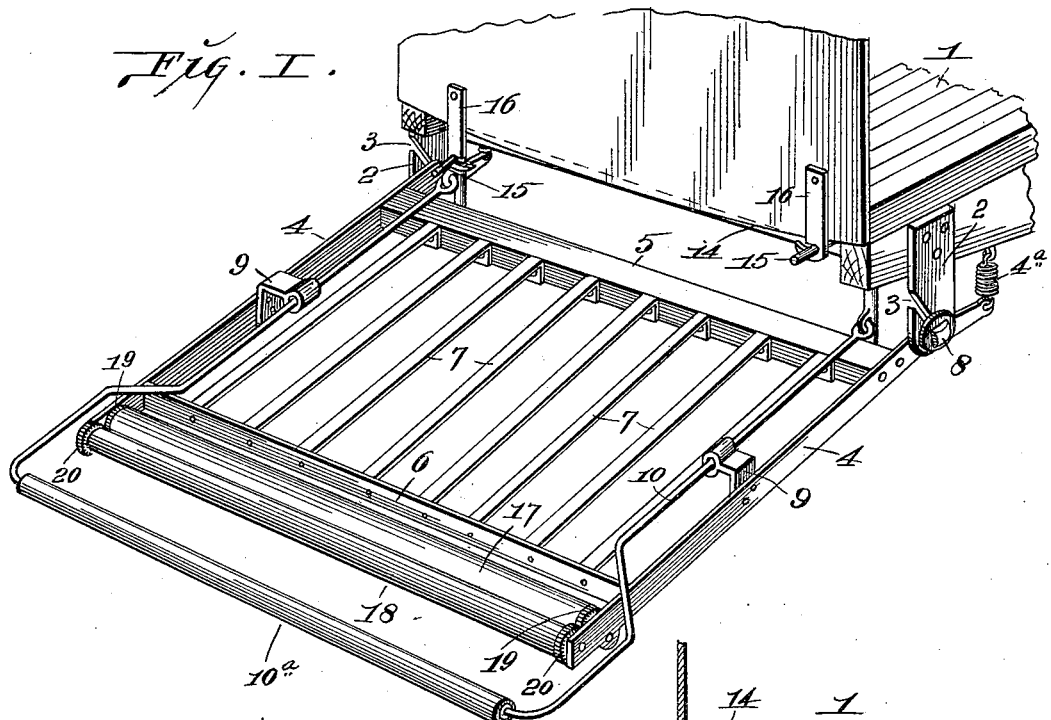
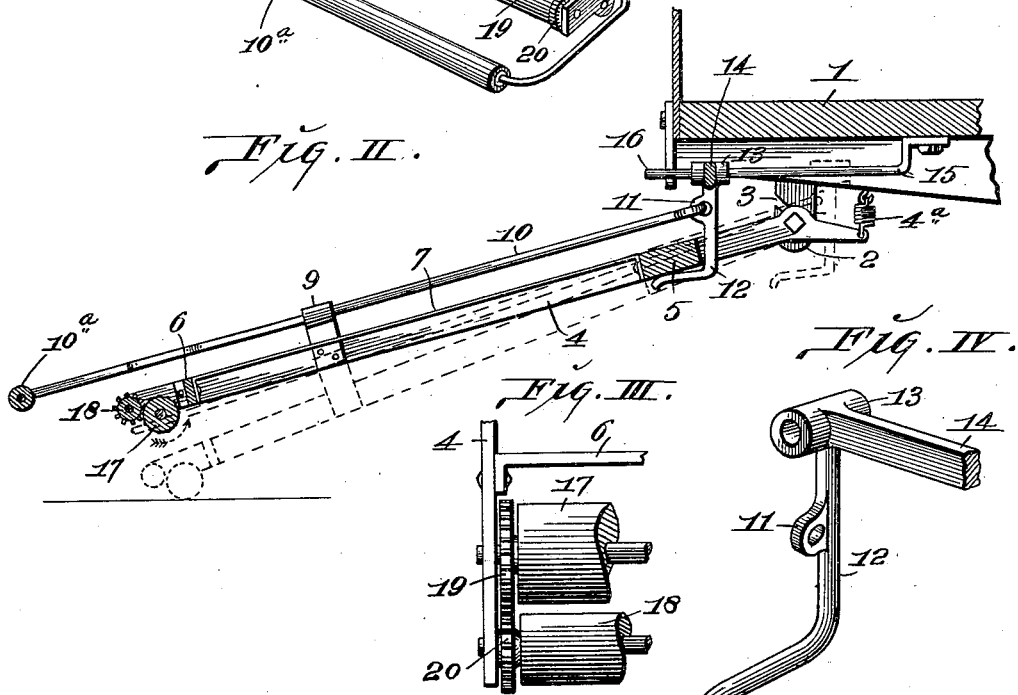
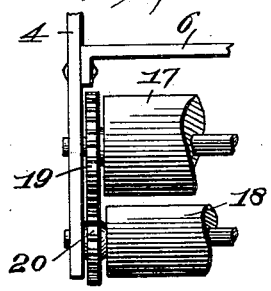
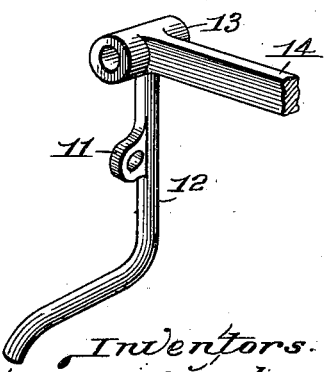
Inventors.
Arthur L. Siegel and
James St. J. Lambe.
By Knight Bros
Atty's.
Attest:

UNITED STATES PATENT OFFICE.

ARTHUR L. SIEGEL AND JAMES ST. J. LAMBE, OF ST. LOUIS, MISSOURI, ASSIGNORS OF ONE-THIRD TO FRANK GAIENNIE, OF SAME PLACE.

STREET-CAR FENDER.

SPECIFICATION forming part of Letters Patent No. 673,735, dated May 7, 1901.

Application filed February 2, 1901. Serial No. 45,667. (No model.)

*To all whom it may concern:*

Be it known that we, ARTHUR L. SIEGEL and JAMES ST. J. LAMBE, citizens of the United States, residing in the city of St. Louis, in the State of Missouri, have invented certain new and useful Improvements in Street-Car Fenders, of which the following is a full, clear, and exact description, reference being had to the accompanying drawings, forming part of this specification.

Our invention relates to a fender or life-saving device carried by street-cars; and the invention consists in features of novelty hereinafter fully described, and pointed out in the claims.

Figure I is a perspective view of our improved fender shown applied to the platform of a street-car. Fig. II is a vertical sectional view taken through the fender. Fig. III is an enlarged detail top view of the ends of rollers carried by the fender at its forward end. Fig. IV is an enlarged detail perspective view of one of the fender-supporting hooks.

1 designates the platform of a street-car to which our fender is shown applied.

2 designates hangers fixed to the car-platform and provided with slots 3. The body of the fender is constructed of a frame having side bars 4, a rear cross-bar 5, a forward cross-bar 6, and strips 7 connected to the cross-bars 5 and 6. The side bars 4 are equipped at their rear ends with pivot-bolts 8, arranged to set in the slots of the hangers 2 and through means of which the frame of the fender is swingingly connected to the car-platform.

9 designates guide-brackets fixed to the side bars 4. The guide-brackets 9 receive a sliding bumper 10 of rod form and of approximately U shape. The forward portion of the sliding bumper 10 projects beyond the forward end of the main frame of the fender, so that it is in a position to receive the impact of any object that may be struck by the fender. The rear ends of the sliding bumper are connected to the ears 11 of hooks 12. The hooks 12 depend from a pair of sliding collars 13, that are connected by a cross-bar 14. Each of the sliding collars 13 is slidingly mounted on supporting-rods 15, secured to the under side of the car-platform 1. The forward ends of the supporting-rods 15 project beyond the front end of the car-platform and are adapted to receive the engagement of pivoted keepers 16, applied to the car-platform or the dash-board carried by said platform. The forward ends of the side bars 4 of the frame extend beyond the forward cross-bar 6 of said frame, and journaled in the extreme ends of said side bars is a main roller 17 and an auxiliary roller 18, the said rollers being geared together by spur-wheels 19 and 20, carried by the shafts of said rollers.

In the practical use of the fender herein described the parts when in normal condition occupy the positions illustrated in Fig. I and in full lines in Fig. II, the forward end of the fender being maintained at an elevation above the ground. In such condition the fender is upheld by the hooks 12, which occupy positions beneath the rear cross-bar 5 of the frame of the fender by reason of their being located forward of the pivots of the fender-frame. While the hooks 12 are in the forward positions referred to and sustaining the fender-frame, the sliding bumper 10 is projected forwardly, so that it extends beyond the forward end of the fender-frame and the rollers 17 and 18 carried thereby. In the event of an object being encountered by the fender said object is struck by the sliding bumper 10 and the bumper is forced rearwardly and carries therewith the hooks 12, causing their sliding collars to be moved on the supporting-rods 15. In such movement of the parts the hooks 12 are carried from beneath the cross-bar 5, thereby releasing the frame of the fender and permitting its forward end to fall to the ground. Upon the forward end of the fender descending the main roller 17 contacts with the ground and is caused to rotate by reason of said contact. The roller 17 rotates in the direction indicated by the dotted arrow in Fig. II and causes the rotation of the spur-wheel 19 in a corresponding direction. The motion of the spur-wheel 19 is communicated to the spur-wheel 20 on the shaft of the auxiliary roller 18, and therefore the auxiliary roller is rotated in the direction reverse of that of the main roller 17. It will therefore be seen that when the bumper 10 strikes an object encountered by the fender the forward end of the fender is caused to fall to the ground and is in a position where any object will be picked up and thrown on the fender with certainty. The roller 17 begins to rotate immediately upon coming in contact with the ground and causes the rotation of the auxiliary roller 18 and said auxiliary roller acts by its rotation to assist in throwing the object struck onto the fender, thereby avoiding any liability of the object struck passing under the fender.

The fender is easily disconnected from one end of the car and replaced at the opposite end of the car, the only performance necessary to disconnect it being to swing the keepers 16 out of engagement with the supporting-rods 15, when the pivot-bolts 8 of the frame may be lifted out of the hangers 2 and the collars 13 of the hooks 12 easily slipped from the supporting-rods 15.

It is obvious that to mount the fender it is only necessary to drop the pivot-bolts into the hangers 2, slide the collars of the hooks 12 onto the supporting-rods 15, and place the keepers 16 in engagement with the supporting-rods 15. The inner ends of the bars 4 are extended beyond the pivots 8 and are provided with coil-springs 4$^a$, hooked to the under side of the car-sills, as shown in Figs. I and II. These springs pull upwardly on the inner ends of the bars 4, and consequently force the cross-bar 5 down on the hooks 12, so that the jolting of the car will not cause the cross-bar to leave the hooks, which would permit the latter to shift inwardly out of engagement with the cross-bar while the car is moving under normal conditions. These springs also serve to hold the roller 17 against the ground when the fender has been tripped.

We prefer to provide the forward portion of the bumper 10 with a roller 10$^a$ to receive the impact of any obstruction.

The bumper, composed of the parts 12 and the part 10, acts in itself to support the main body of the fender under normal conditions and when contacting with an obstruction moves inwardly and allows the body of the fender to drop, thus providing a very simple and effective means for supporting the body of the fender out of contact with the ground except when an obstruction is met with, and then the part (the bumper) that must necessarily contact with the construction first moves and permits the dropping of the body of the fender into a position that will cause it to pick up the obstruction.

We claim as our invention—

1. In a car-fender, the combination of a swingingly-mounted frame, slidingly-mounted hooks, adapted to engage the rear end of said frame and the bumper secured to said hooks and having a sliding connection with said frame, said bumper extending forwardly to a position in front of the frame.

2. In a car-fender, the combination of a swingingly-mounted frame, a bumper slidingly mounted on said frame and extending forwardly to a position forward of the front end of the frame, slidingly-mounted hooks, connected to the rear end of the bumper and adapted to engage the rear end of the frame, and a cross-bar connecting said hooks whereby they slide in unison.

3. In a car-fender, the combination of a swingingly-mounted frame, horizontally-positioned supporting-rods secured under a car, hooks slidingly mounted on said rods adapted to suspend the fender-frame, a cross-bar connecting said hooks whereby they move in unison and a bumper slidingly mounted on the frame and connected to said hooks and extending to a position forward of the front end of said frame.

ARTHUR L. SIEGEL.
JAMES ST. J. LAMBE.

In presence of—
GEO. H. KNIGHT,
N. V. ALEXANDER.